United States Patent
Batni et al.

(10) Patent No.: US 7,693,134 B2
(45) Date of Patent: Apr. 6, 2010

(54) METHOD AND APPARATUS FOR PROVIDING MULTIMEDIA RINGBACK SERVICES TO USER DEVICES IN IMS NETWORKS

(75) Inventors: Ramachendra Prahlada Batni, Phoenix, AZ (US); Katherine H. Guo, Eatontown, NJ (US); Anand Kagalkar, Edison, NJ (US); Sarit Mukherjee, Morganville, NJ (US); Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1498 days.

(21) Appl. No.: 11/027,298

(22) Filed: Dec. 30, 2004

(65) Prior Publication Data
US 2006/0165059 A1    Jul. 27, 2006

(51) Int. Cl.
*H04L 12/66* (2006.01)
(52) U.S. Cl. ............... 370/352; 379/88.17; 379/210.01
(58) Field of Classification Search ......... 370/353–356, 370/352; 455/419, 566, 567, 556.2; 379/88.17, 379/207.16, 210.01
See application file for complete search history.

(56) References Cited

U.S. PATENT DOCUMENTS

| | | | |
|---|---|---|---|
| 6,377,568 B1 * | 4/2002 | Kelly ........................ | 370/352 |
| 6,400,804 B1 | 6/2002 | Bilder | |
| 7,142,656 B2 * | 11/2006 | Moody et al. .......... | 379/207.16 |
| 2004/0114732 A1 | 6/2004 | Choe et al. | |
| 2004/0120494 A1 * | 6/2004 | Jiang et al. ............. | 379/210.01 |
| 2005/0185771 A1 * | 8/2005 | Benno et al. ............. | 379/88.17 |
| 2006/0147010 A1 * | 7/2006 | Batni et al. ............ | 379/202.01 |
| 2006/0206604 A1 * | 9/2006 | O'Neil et al. ............... | 709/223 |
| 2007/0121595 A1 * | 5/2007 | Batni et al. .................. | 370/356 |
| 2007/0161412 A1 * | 7/2007 | Nevid et al. ................. | 455/567 |
| 2007/0189474 A1 * | 8/2007 | Cai ........................ | 379/142.01 |

(Continued)

FOREIGN PATENT DOCUMENTS

EP    05 25 7735    3/2006

(Continued)

OTHER PUBLICATIONS

SIP WG G. Camarillo Ericsson H. Schulzrinne Columbia University: "Early Media and Ringback Tone Generation in the Session Initiation Protocol" IETF Standard-Working-Draft, Internet Engineering Task Force, IETF, CH, No. 1, Feb. 10, 2003, pp. 1-10, XP015000437 ISSN: 0000-0004.

(Continued)

*Primary Examiner*—Gerald Gauthier
(74) *Attorney, Agent, or Firm*—Wall & Tong, LLP

(57) ABSTRACT

The invention comprises a method and apparatus for providing multimedia content to a calling party device. Specifically, the method comprises receiving a connection establishment request from a calling party device where the connection establishment request is operable for establishing a connection between the calling party device and a called party device in an Internet Protocol (IP) Multimedia Subsystem (IMS) network, obtaining multimedia content information in response to the connection establishment request where the multimedia content information is operable for establishing at least one multimedia session with the calling party device, and transmitting at least a portion of the multimedia content information towards the calling party device contemporaneously with establishment of the connection.

22 Claims, 4 Drawing Sheets

U.S. PATENT DOCUMENTS

2007/0281750 A1 * 12/2007 Cox et al. .................. 455/567

FOREIGN PATENT DOCUMENTS

| EP | 05 25 7737 | 3/2006 |
|---|---|---|
| WO | WO 2004/054282 A | 6/2004 |
| WO | WO 2004/084566 A | 9/2004 |

OTHER PUBLICATIONS

"Digital cellular telecommunications system (Phase 2+); Universal Mobile Telecommunications System (UMTS); IP Multimedia (IM) session handling; IM call model; Stage 2 (3GPP TS 23.218 version 6.2.0 Release 6); ETSI TS 123 218" ETSI Standards, European Telecommunications Standards Institute, Sophia-antipo, FR, vol. 3-CN1, No. V620, Sep. 2004, XP014027526 ISSN: 0000-0001.

* cited by examiner

METHOD AND APPARATUS FOR PROVIDING MULTIMEDIA RINGBACK SERVICES TO USER DEVICES IN IMS NETWORKS

FIELD OF THE INVENTION

The invention relates to the field of communication networks and, more specifically, to providing ringback services to user devices.

BACKGROUND OF THE INVENTION

In general, existing ringback services enable wireless service subscribers to pre-select audio content to be played to communication devices from which calls are initiated to the wireless service subscribers. The audio ringback service replaces a traditional ringing sound (heard by a calling party before the called party answers) with enhanced audio content specified by the called party. As such, the audio ringback service enables the called party to customize audio content that a calling party hears during connection establishment between the calling party device and the called party device. For example, audio content played to a calling party includes specialized ring tones, announcements, music, and similar enhanced audio content. Unfortunately, existing ringback services are currently limited to providing purely audio content.

SUMMARY OF THE INVENTION

Various deficiencies in the prior art are addressed through the invention of a method and apparatus for providing multimedia content to a calling party device. Specifically, a method according to one embodiment of the invention comprises receiving a connection establishment request from a calling party device where the connection establishment request is operable for establishing a connection between the calling party device and a called party device in an Internet Protocol (IP) Multimedia Subsystem (IMS) network, obtaining multimedia content information in response to the connection establishment request where the multimedia content information is operable for establishing at least one multimedia session with the calling party device, and transmitting at least a portion of the multimedia content information towards the calling party device contemporaneously with establishment of the connection.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of an Internet Protocol (IP) Multimedia Subsystem (IMS) network architecture comprising an IMS network and a plurality of access networks; however, the methodology of the present invention can readily be applied to other network architectures. In general, the IMS network architecture enables convergence of voice, data, and wireless technologies over an IP-based infrastructure. As described herein, an IMS network architecture may be deployed in support of Third Generation (3G) wireless networks, Fourth Generation (4G) wireless networks, and the like. As such, the IMS network architecture enables real-time, multimedia wireless services such as rich voice, messaging, conferencing, video telephony, and like multimedia services.

In general, the present invention enables service providers to provide multimedia ringback content to a calling party device during connection establishment between the calling party device and a called party device. Using an IMS-based network architecture, the present invention enables non-video content (e.g., text, still-image, animated-image, and like non-video content) to be provided to the calling party device contemporaneous with establishment of a video session for providing video content (e.g., movie clips, home video clips, and like video content) to the calling party device. As such, the present invention enables the calling party to experience various combinations of multimedia content selected by the called party for presentation to the calling party during connection establishment.

Figure 1:
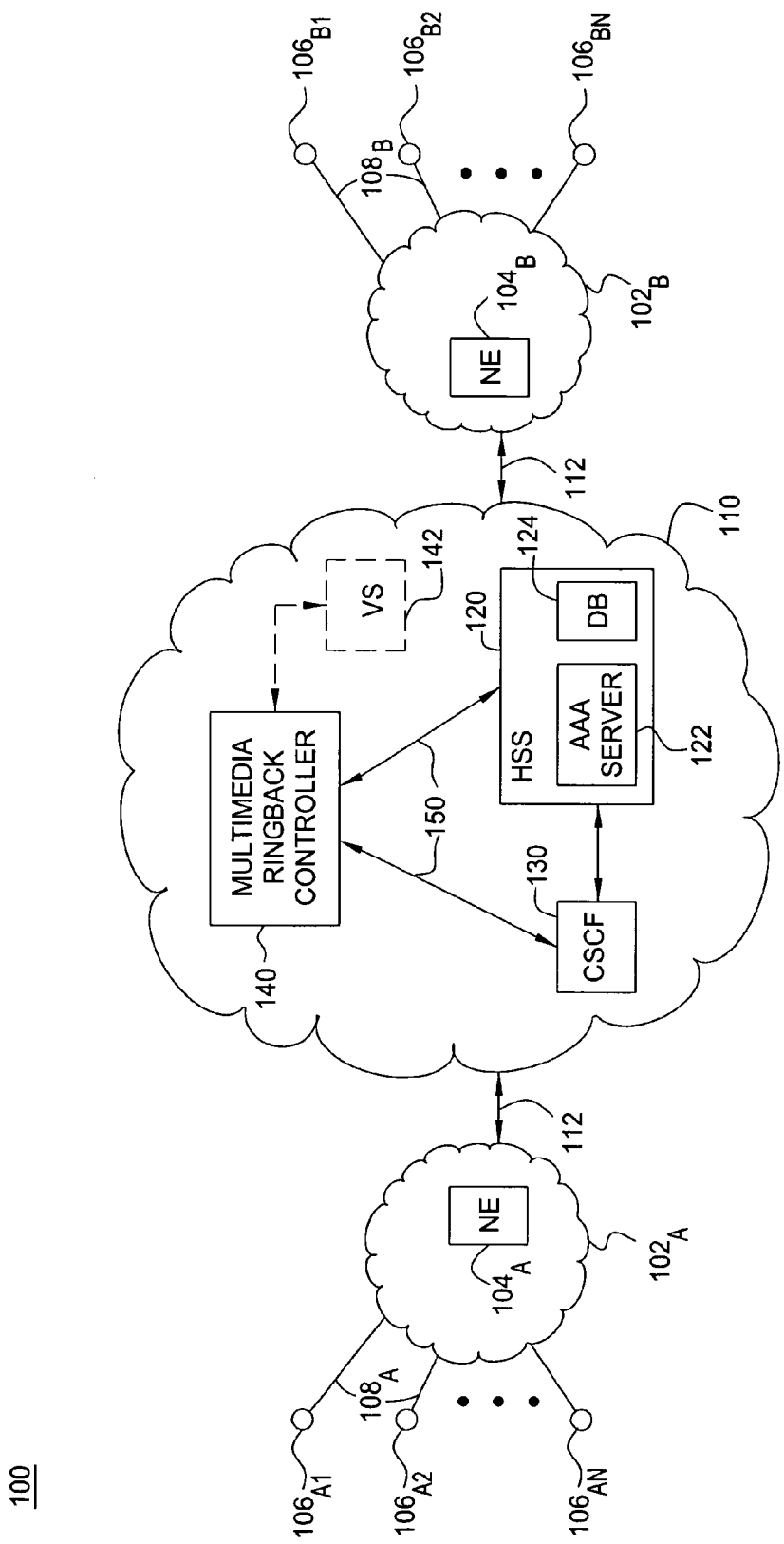
FIG. 1 depicts a high-level block diagram of a communication network architecture.

FIG. 1 depicts a high-level block diagram of a communication network architecture. Specifically, communication network architecture 100 of FIG. 1 comprises a plurality of access networks (ANs) $102_A$-$102_B$ (collectively, ANs 102), and an IMS-based network (IMSN) 110. As depicted in FIG. 1, ANs 102 communicate with IMSN 110 via a respective plurality of communication links (CLs) 112 (collectively, CLs 112). Although depicted as directly connected via CLs 112, those skilled in the art will appreciate that communication between the ANs 102 and IMSN 110 is facilitated using additional network elements and communication links (not depicted).

As depicted in FIG. 1, AN $102_A$ comprises a network element (NE) $104_A$. An associated plurality of user devices (UDs) $106_{A1}$-$106_{AN}$ (collectively, UDs $106_A$) access AN $102_A$ via a respective plurality of access links (ALs) $108_A$ (collectively, ALs $108_A$). Similarly, AN $102_B$ comprises a network element (NE) $104_B$. An associated plurality of user devices (UDs) $106_{B1}$-$106_{BN}$ (collectively, UDs $106_B$) access AN $102_B$ via a respective plurality of access links (ALs) $108_B$ (collectively, ALs $108_B$). The NE $104_A$ and NE $104_B$ are collectively denoted as NEs 104. The UDs $106_A$ and UDs $106_B$ are collectively denoted as UDs 106.

As depicted in FIG. 1, the ANs 102 comprise various wireline networks and wireless networks operable for providing multimedia services to the UDs 106. As such, the NEs 104, which vary based on AN type, comprise various network elements operable for supporting the methodologies of the present invention. As such, depending upon the underlying network architecture, the NEs 104 comprise at least one of a Packet Data Serving Node (PDSN), a Gateway General Packet Radio Service (GPRS) Support Node (GGSN), a router, a switch, and like network elements for facilitating communication between various access networks and an IMS network.

In one embodiment, the ANs 102 comprises at least one of: a 3G wireless AN (e.g., a Wideband Code Division Multiple Access (WCDMA) AN, a Universal Mobile Telecommunications System (UMTS) AN, a CDMA2000 AN, and the like), a 4G wireless AN, and like wireless ANs as known in the art. In one embodiment, for example, in which an AN 102 comprises a CDMA2000 Evolution Data Only (EvDO) network, the corresponding NE 104 comprises a PDSN. In another embodiment, for example, in which an AN 102 comprises a UMTS High-Speed Downlink Packet Access (HSDPA) network, the corresponding NE 104 comprises a GGSN.

Although depicted as comprising NEs 104, those skilled in the art will appreciate that ANs 102 comprise additional network elements. As such, in one embodiment in which an AN 102 comprises a wireless AN, the AN 102 may comprise various combinations of base station controllers (BSCs), visitor location registers (VLRs), home location registers (HLRs), radio network controllers (RNCs), serving GPRS support nodes (SGSNs), mobile switching centers (MSCs), and like network elements as known in the art. In one embodiment, at least a portion of the additional network elements depend on the wireless AN technology. For example, at least a portion of the network elements deployed in a CDMA2000 network may differ from at least a portion of the network elements deployed in a UMTS network.

In another embodiment, the ANs 102 comprise at least one of: an IP AN, a Public Switched Telephone Network (PSTN), an Integrated Services Digital Network (ISDN) AN, and like wireline ANs as known in the art. In one such embodiment, for example, in which an AN 102 comprises an IP AN, the corresponding NE 104 comprises a Border Element (BE). In one embodiment, at least a portion of the additional network elements depend on the wireline AN technology. As such, in one embodiment, in which an AN 102 comprises a wireline AN, the AN 102 comprises various combinations of switches, routers, and like network elements as known in the art.

In one embodiment, the NEs 104 operate as NEs for switching calls within each of the respective ANs 104. In general, operating in this capacity, the NEs perform switching functions, signaling functions (e.g., common channel signaling), and like functions. As depicted in FIG. 1, the NEs 104 operate as respective points-of-access to IMSN 110. In one embodiment, the NEs 104 operate as both originating-NEs and terminating-NEs, depending upon the source and destination of a connection establishment request.

For example, for a connection establishment request initiated from UD $106_{A1}$ (calling user device) to UD $106_{B1}$ (called user device), NE $104_A$ functions as an originating-NE and NE $104_B$ functions as a terminating-NE. Similarly, for example, for a connection establishment request initiated from UD $106_{B2}$ (calling user device) to UD $106_{A1}$ (called user device), NE $104_B$ functions as an originating-NE and NE $104_A$ functions as a terminating-NE.

As described herein, the UDs 106 comprise user devices operable for initiating and receiving calls, as well as accessing various network services, via the associated ALs 108. As such, although described herein with respect to mobile phones, the UDs 106 comprise wireless UDs (e.g., mobile phones, personal digital assistants (PDAs), computers, and like wireless devices), wireline UDs (e.g., IP-phones, Session Initiation Protocol (SIP) phones, computers, and like wireline devices), and like UDs as known in the art.

As described herein, the UDs 106 comprise user devices operable for receiving, processing, and displaying multimedia content, as known in the art. It should be noted that a user initiating a call is denoted as a calling party and a user to which a call is initiated is denoted as a called party. As such, a UD from which a call is initiated is denoted as a calling user device and a UD to which a call is initiated is denoted as a called user device.

As depicted in FIG. 1, IMSN 110 comprises a Home Subscriber Server (HSS) 120, a call state control function (CSCF) 130, and a multimedia ringback controller (MRC) 140. As depicted in FIG. 1, HSS 120, CSCF 130, and MRC 140 communicate via a plurality of communication links (CLs) 150 (collectively, CLs 150). In general, CSCF 130 provides SIP-based call control functionality and executes SIP-based session handling functionality for providing multimedia services via IMSN 110 and the associated ANs 102. In one embodiment, CSCF 130 supports at least one of: serving-CSCF (S-CSCF) functionality, interrogating-CSCF (I-CSCF) functionality, proxy-CSCF (P-CSCF) functionality, and like CSCF functionality.

In one embodiment, S-CSCF functionality comprises session state management functionality, HSS-interworking functionality for obtaining subscriber information and supporting application server interworking, and like functionality. In one embodiment, I-CSCF functionality comprises HSS interworking functionality, connection establishment functionality, Topology Hiding Inter-network Gateway (THIG) functionality, and like functions. In one embodiment, P-CSCF functionality comprises IMS network access-point functionality for UDs attempting to access IMSN 110, quality of service functionality, and like functionality.

As depicted in FIG. 1, the HSS 120 comprises an Authentication, Authorization, and Accounting (AAA) server 122 and at least one database (DB) 124. In general, AAA server 122 comprises a system for controlling access to network resources, tracking user network activities, and like functionality. In one embodiment, the DB 124 comprises a database for maintaining subscriber information (e.g., account information, user service preferences, handset model number and associated terminal capability information, and like information) associated with communications service subscribers.

In one embodiment, subscriber information comprises at least one of: connection establishment information and subscriber service information. In one embodiment, connection establishment information comprises information for locating UDs (e.g., for locating a called party device in response to a call initiated by a calling party). In another embodiment, the subscriber service information comprises an indication as to whether a particular subscriber subscribes to multimedia ringback service, content identifiers for determining multimedia content to provide to a calling party device, and like subscriber service information.

In another embodiment, DB 124 comprises a database for maintaining UD terminal capability information (e.g., mappings between UD model numbers and various terminal capabilities supported by the UD). As such, the DB 124 comprises terminal capability parameters such as UD terminal class, UD screen size, UD color capabilities, session capabilities, encoding/decoding capabilities, and the like UD terminal capabilities. For example, DB 124 may associate UD model number 101XZ with terminal capabilities supported by UD model number 101XZ. In one such embodiment, at least a portion of the UD terminal capability information is used for determining at least a portion of the multimedia content selected by a MRC for transmission to a calling party device during connection establishment.

In one embodiment, IMSN 110 optionally comprises a video server (VS) 142. Although not depicted, those skilled in the art will appreciate that IMSN 110 comprises various other network elements and service elements, such as border elements, core elements, call admission controllers, network routing engines, user profile engines, domain name servers, service broker systems, media gateways, media gateway control functions, breakout gateway control functions, media resource functions, multimedia resource function processors, media servers, and like network elements and service elements for supporting IMS network traffic and associated services.

As depicted in FIG. 1, MRC 140 comprises a system for controlling multimedia ringback services provided to a calling party device during connection establishment between the calling party device and the called party device. In one embodiment, MRC 140 comprises an application server for providing multimedia content to a calling party device. As such, in one embodiment, MRC 140 stores text content, still-image content, animated-image content, video content, and like multimedia content. As depicted in FIG. 1, MRC 140 communicates with HSS 120 and CSCF 130 via a plurality of communication links (CLs) 150 (collectively, CLs 150).

In one embodiment, for example, controlling multimedia ringback service comprises identifying multimedia content for transmission to a calling party device in response to a determination that the called party device subscribes to multimedia ringback service. In another embodiment, for example, controlling multimedia ringback service comprises establishing a video session between at least one content server and the calling party device for providing video content to the calling party device during connection establishment. As such, in one embodiment, the MRC 120 performs at least a portion of the methodologies of the present invention, as described herein.

Although depicted as comprising various numbers of ANs 102, NEs 104, UDs 106, ALs 108, IMSNs 110, HSSs 120, AAA servers 122, DBs 124, CSCFs 130, MRCs 140, CLs 150, and VSs 142, those skilled in the art will appreciate that fewer or more ANs 102, NEs 104, UDs 106, ALs 108, IMSNs 110, HSSs 120, AAA servers 122, DBs 124, CSCFs 130, MRCs 140, CLs 150, and VSs 142, may be used. Similarly, the ANs 102, NEs 104, UDs 106, ALs 108, IMSNs 110, HSSs 120, AAA servers 122, DBs 124, CSCFs 130, MRCs 140, CLs 150, and VSs 142, may be deployed in various configurations. Furthermore, although depicted as communicating with IMSN 110, in one embodiment, the ANs 102 interface with various other networks such as personal digital cellular (PDC) networks, packet data switched networks (PDSNs), and like networks.

Figure 2:
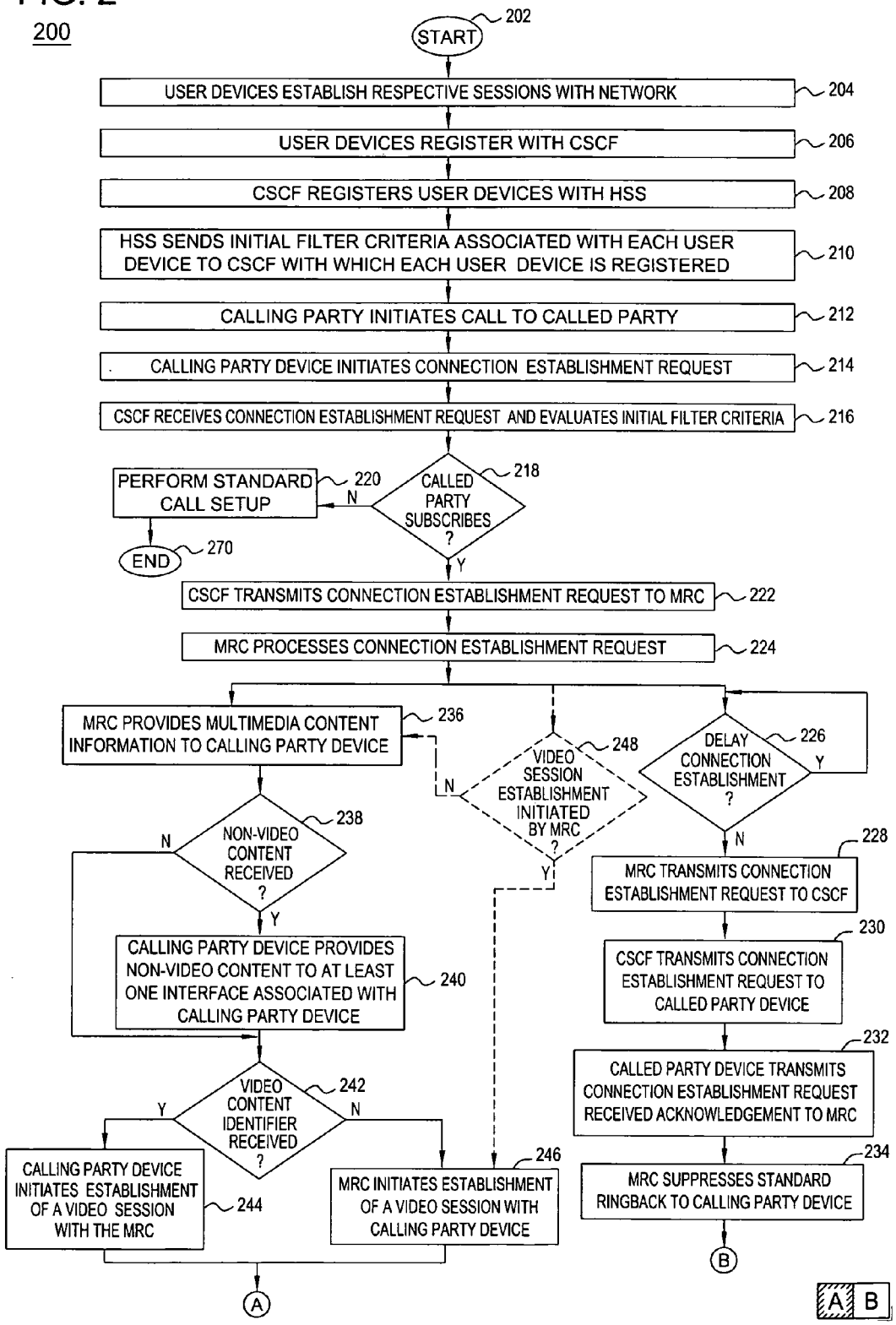
FIG. 2 depicts a flow diagram of a method according to one embodiment of the invention.
Figure 2:
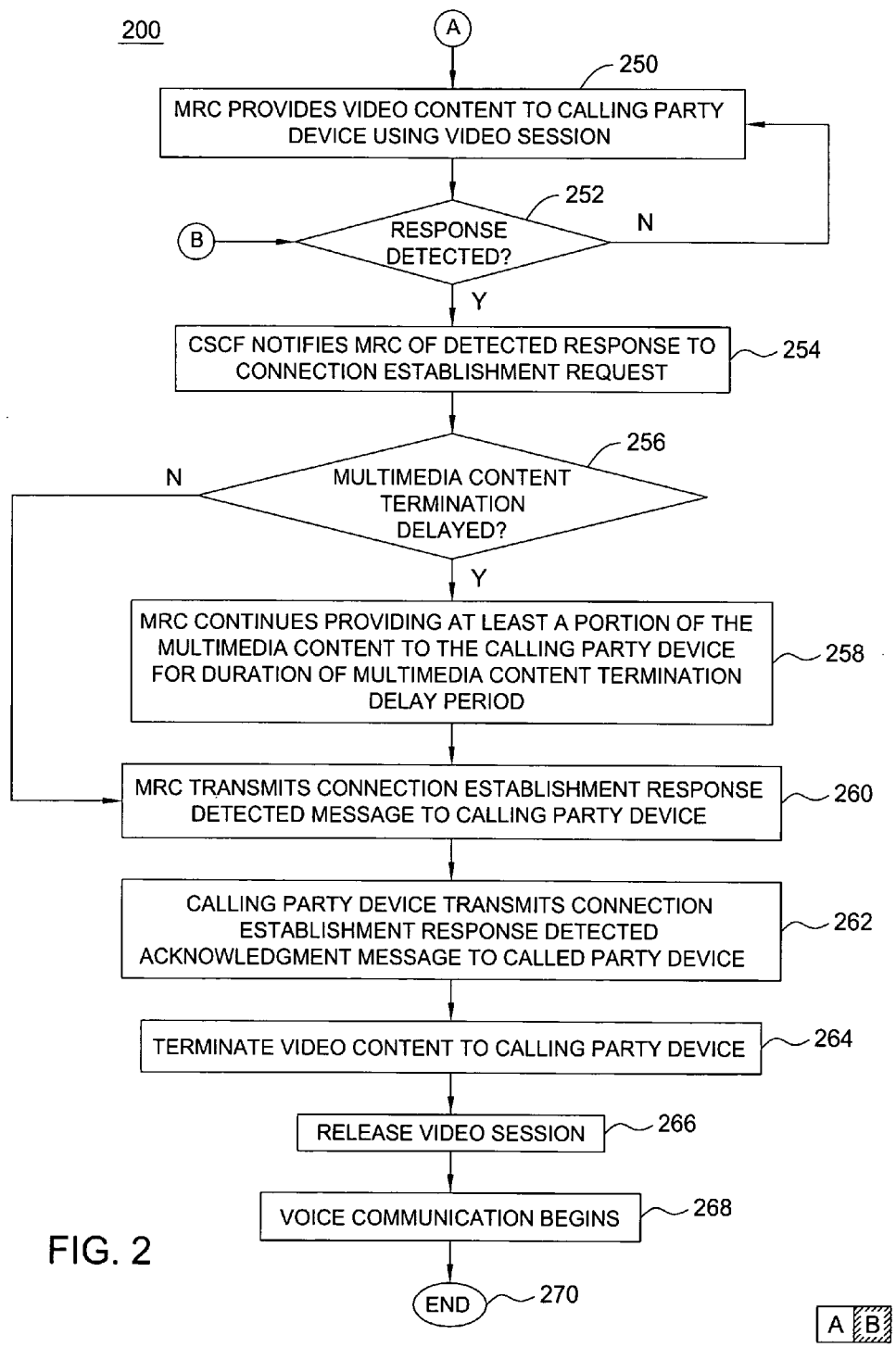

FIG. 2 depicts a flow diagram of a method according to one embodiment of the invention. Specifically, method 200 of FIG. 2 comprises a method for providing multimedia content to a calling party device. Although a portion of the steps are depicted as being performed serially, those skilled in the art will appreciate that at least a portion of the serially-depicted steps of method 200 may be performed contemporaneously. Furthermore, although primarily described herein with respect to a CDMA2000 EvDO network architecture, those skilled in the art will appreciate that the methodology of FIG. 2 may be performed in a variety of network architectures. The method 200 is entered at step 202 and proceeds to step 204.

At step 204, user devices establish respective sessions with a network. In one embodiment, in which a user device accesses at least one of a GPRS network, a UMTS network, and like networks, the user device establishes a Packet Data Protocol (PDP) session with the network. For example, in one embodiment, in which a user device establishes a connection with a UMTS HSDPA network, the user device establishes a PDP session with a GGSN. In another embodiment, in which a user device accesses an American National Standards Institute (ANSI) based network (e.g., a CDMA network), the user device establishes a Point-to-Point Protocol (PPP) session with the network. For example, in one embodiment, in which a user device establishes a connection with a CDMA2000 EvDO network, the user device establishes a PPP session with a PDSN. As such, prior to the initiation of a connection establishment request from a calling party device to a called party device, the calling party device and called party device establish respective sessions with NEs associated with the AN through which the devices access the IMSN.

At step 206, user devices register with a CSCF. In one embodiment, in which a user device registers with the CSCF using SIP, the CSCF functions as a S-CSCF for user device registration (i.e., as a SIP registrar enabling a user device to register with the CSCF using SIP). Although depicted as comprising one CSCF (illustratively, CSCF 130), in one embodiment, a plurality of CSCFs are deployed such that a calling party device registers with an originating (first) CSCF and a called party device registers with a terminating (second) CSCF.

At step 208, the CSCF registers the user devices with a HSS. At step 210, the HSS sends initial filter criteria associated with each user device to the CSCF with which each user device registered. In one embodiment, the CSCF receives and stores the initial filter criteria. In one embodiment, as depicted in FIG. 1, at least a portion of the initial filter criteria are transmitted to CSCF 130 by HSS 120. In another embodiment, at least a portion of the initial filter criteria is obtained from at least one of: AAA server 122 and DB 124. In one embodiment, the initial filter criteria comprise at least one of: connection establishment information and service subscription information.

In one embodiment, connection establishment information comprises at least one of: calling party information, calling party device information, called party information, and called party device information. For example, in one embodiment, the connection establishment information comprises calling party device routing information, called party device routing information for locating the called party device, and like information. In one embodiment, service subscription information comprises at least one of: calling party subscription information and called party subscription information. For example, in one embodiment, called party subscription information comprises at least one parameter for determining whether the called party subscribes to a multimedia ringback service.

In one embodiment, the called party subscription information comprises at least one multimedia content identifier. In one further embodiment, the called party subscription information comprises at least one multimedia content identifier associated with each calling party. In one embodiment, the association of multimedia content to a calling party, is configurable by the called party such that specific multimedia content is capable of being targeted to specific calling parties. In one further embodiment, multimedia content provided to a calling party device is configurable based on call date, call time, and like parameters.

In one embodiment, called party subscription information comprises at least one multimedia content identifier for providing specific multimedia content (e.g., specific content identifiers associated with various audio, text, image, and video content) to calling party devices during connection establishment irrespective of the calling party. For example, a particular video clip is provided to all calling party devices attempting to establish a connection with the called party device. In another embodiment, the called party subscription information comprises at least one multimedia content identifier for providing specific multimedia content to a specific calling party during connection establishment. For example, an animated image is provided to one calling party while a text message is provided to another calling party.

At step 212, a calling party initiates a call to a called party. At step 214, in response to the call initiated by the calling party, the associated calling party device initiates a connection establishment request for establishing a connection with the associated called party device. In other words, the calling party attempts to establish a connection (i.e., a voice communication channel) with the called party. In one embodiment, in which the calling party initiates a VOIP call to the called party, the connection establishment request comprises a SIP INVITE message.

For example, assume that a calling party associated with UD $106_{A2}$ (calling party device) initiates a VOIP call to a called party associated with UD $106_{B1}$ (called party device). As described herein, prior to initiation of the call, the calling party device UD $106_{A2}$ establishes a PPP session with a PDSN (illustratively, NE $104_A$) associated with AN $102_A$ and called party device UD $106_{B1}$ establishes a PPP session with a PDSN (illustratively, NE $104_B$) associated with AN $102_N$. Furthermore, CSCF 130 stores initial filter criteria (obtained from HSS 120) associated with called party device UD $106_{B1}$. In this example, the initial filter criteria comprise service subscription information for determining whether the called party subscribes to the multimedia ringback service.

At step 216, the CSCF receives the connection establishment request and evaluates associated initial filter criteria. In one embodiment, the CSCF receives the connection establishment request via the NE (e.g., PDSN) with which the calling party device established the PPP session during device registration. In one embodiment, as depicted in FIG. 1, in which the calling party device and called party device are registered with a common CSCF, the CSCF receives the connection establishment request, processes the connection establishment request for identifying the called party, and evaluates the initial filter criteria associated with the called party.

In another embodiment (not depicted), in which the calling party device registered with an originating-CSCF and the called party device registered with a terminating-CSCF, upon receiving the connection establishment request the originating-CSCF transmits the connection establishment request to the terminating-CSCF. In this embodiment, upon receiving the connection establishment request, the terminating-CSCF processes the connection establishment request for identifying the called party, and evaluates the initial filter criteria associated with the called party.

In one embodiment, in which the connection establishment request comprises a SIP INVITE message, the CSCF functions as a S-CSCF (i.e., the CSCF functions as a SIP proxy). In continuation of the above example, CSCF 130 receives from NE $104_A$ the connection establishment request (e.g., the SIP INVITE message) initiated by calling party device UD $106_{A2}$. The CSCF uses the SIP INVITE message to identify the called party (associated with the called party device UD $106_{B1}$) and evaluates the initial filter criteria associated with the called party.

At step 218, a determination is made as to whether the called party subscribes to a multimedia ringback service. In one embodiment, the determination is performed using at least a portion of the initial filter criteria received by the CSCF from the HSS during device registration. In one such embodiment, the determination is performed as a portion of the initial filter criteria evaluation performed by the CSCF. In another embodiment, the determination is performed by querying at least one database associated with at least one remote system. In this embodiment, the at least one remote system comprises at least one of: a HSS, an AAA server, a billing database, a service subscription database, and like remote systems and databases.

If the called party device does not subscribe to a multimedia ringback service, method 200 proceeds to step 220, at which point standard connection establishment is performed. In one exemplary embodiment, standard connection establishment is performed using at least a portion of steps 228, 230, 232, 252, 254, 262, and 264, as depicted and described herein with respect to FIG. 2. It should be noted that in this embodiment, however, standard connection establishment communication is facilitated by at least one CSCF (not by a MRC as depicted and described with respect to FIG. 2). The method 200 then proceeds to step 270 where method 200 ends. If the called party device does subscribe to a multimedia ringback service, method 200 proceeds to step 222.

At step 222, the CSCF transmits the connection establishment request to a MRC. In one embodiment, the connection establishment request comprises a SIP INVITE message. At step 224, the MRC processes the received connection establishment request. The method 200 then proceeds to step 226 and step 236 contemporaneously. In continuation of the above example, CSCF 130 transmits the SIP INVITE message to MRC 140, and MRC 140 processes the received SIP INVITE message.

In one embodiment, processing the received connection establishment request comprises obtaining multimedia content information associated with the calling party (i.e., configured to be provided to the calling party device contemporaneous with connection establishment). In one embodiment, the multimedia content information is operable for establishing at least one multimedia session with the calling party device. In one embodiment, the at least one multimedia session comprises a video session for providing video content to the calling party device. In another embodiment, the at least one multimedia session comprises a non-video session for providing non-video content to the calling party device.

In one embodiment, multimedia content information comprises non-video content. In another embodiment, multimedia content information comprises at least one video content identifier for establishing a video session between the calling party device and a system capable of providing video content to the calling party device (e.g., MRC 140, VS 142, and the like). As such, in one embodiment, multimedia content comprises non-video content (e.g., text content, still-image content, animated-image content, and like non-video content), video content, and like content.

In one embodiment, processing the received connection establishment request comprises identifying multimedia content information associated with the calling party (i.e., configured to be provided to the calling party device contemporaneous with connection establishment). In one embodiment, the multimedia content is identified using at least one user identifier associated with the calling party, where the at least one user identifier is determined from the connection establishment request received from the CSCF (e.g., from a SIP INVITE message, from another message associated with a SIP INVITE message, and the like).

In another embodiment, at least a portion of the multimedia content is identified by querying at least one database. In one such embodiment, the at least one database comprises at least one local database associated with the MRC. In another such embodiment, the at least one database comprises at least one remote database in communication with the MRC using at least one of: a Lightweight Directory Access Protocol (LDAP), a Transmission Control Protocol (TCP)/IP connection, and the like.

In one embodiment, processing the received connection establishment request comprises performing a determination as to whether the calling party device is capable of receiving at least a portion of the multimedia content. In one embodiment, the MRC determines multimedia content characteristics associated with the identified multimedia content information. In one further embodiment, the MRC then queries at least one database for determining UD terminal capabilities associated with the calling party device. In one further embodiment, the MRC selects at least a portion of the multimedia content information according to at least one of the multimedia content characteristics and at least one of the terminal capabilities associated with the calling party device.

For example, the MRC may determine that two still images are available for display to a particular calling party device (one Joint Photographics Expert Group (JPEG) image and one Graphics Interchange Format (GIF) image). In this example, the MRC may determined that the calling party device is capable of displaying both JPEG and GIF images and, as such, the MRC selects the JPEG image (the higher quality image) as a portion of the multimedia content information provided to the calling party device. On the other hand, the MRC may determine that the calling party device is only capable of displaying GIF images, at which point the MRC selects the default GIF image as a portion of the multimedia content information provided to the calling party device.

In one embodiment, selection of at least a portion of the multimedia content provided to the calling party device is performed using at least one terminal capability parameter associated the calling party device. For example, in continuation of the above example, upon determining that calling party device UD $106_{A2}$ comprises image content viewing capabilities but does not comprise video content viewing capabilities (e.g., a video player), the MRC selects the image content for providing the image content to the calling party device UD $106_{A2}$. In this example, the MRC ignores the video content associated with the calling party device UD $106_{A2}$ since calling party device UD $106_{A2}$ is not capable of displaying the video content to the calling party.

Similarly, in one embodiment, selection of the means by which at least a portion of the multimedia content is provided to the calling party device is performed using at least one terminal capability parameter associated with the calling party device. For example, in continuation of the above example, upon determining that calling party device UD $106_{A2}$ supports Motion Picture Experts Group Four (MPEG4) decoding functionality, the MRC prepares to stream the identified video content to calling party device UD $106_{A2}$ using MPEG4 encoding.

As depicted in FIG. 2, step 226 and step 236 (and, optionally, step 248) are performed contemporaneously. Similarly, at least a portion of steps 226 through 234 may be performed contemporaneously with at least a portion of steps 236 through 250. As such, in one embodiment, non-video content is provided to the calling party device contemporaneous with establishment of the connection between the calling party device and the called party device. Similarly, in one embodiment, establishment of the video session for providing video content to the calling party device is performed contemporaneous with establishment of the connection between the calling party device and the called party device. Furthermore, in one embodiment, establishment of the video session for providing video content to the calling party device is performed contemporaneously with the providing of non-video content to the calling party device.

At step 226, a determination is made as to whether connection establishment is delayed. In one embodiment, the determination as to whether connection establishment is delayed is made by the MRC (illustratively, MRC 140). If connection establishment is delayed, the method 200 returns to step 226 (i.e., the MRC continuously monitors for completion of a connection establishment delay period). If connection establishment is not delayed (e.g., a connection establishment delay period is not configured, a configured connection establishment delay period expired, and the like), the method 200 proceeds to step 228.

At step 228, the MRC transmits the connection establishment request to the CSCF for establishing a connection (e.g., a voice communication channel) between the calling party device and the called party device. In one embodiment, as described herein, the connection establishment request comprises a SIP INVITE message. In one embodiment, in which the calling party device and called party device register with different CSCFs, the MRC transmits the connection establishment request to the terminating-CSCF (i.e., the CSCF associated with the called party device). In continuation of the above example, MRC 140 transmits the SIP INVITE message to CSCF 130 associated with called party device UD $106_{B1}$.

At step 230, the CSCF transmits the connection establishment request to the called party device. In other words, the CSCF associated with the called party device signals the called party device for notifying the called party of the incoming call. In one embodiment, the connection establishment request received by the called party device causes the called party device to ring, vibrate, flash, and the like. In continuation of the above example, CSCF 130 transmits the SIP INVITE message to called party device UD $106_{B1}$.

At step 232, the called party device transmits a connection establishment request received acknowledgement to the MRC. In one embodiment, the connection establishment request received acknowledgement is transmitted to the MRC via the CSCF with which the called party device is associated. In one embodiment, the connection establishment request received acknowledgement comprises a SIP 180 RINGING message. In continuation of the above example, called party device UD $106_{B1}$ transmits a SIP 180 RINGING message to CSCF 130, which then transmits the SIP 180 RINGING message to MRC 140.

At step 234, the MRC suppresses standard ringback to the calling party device. The suppression of standard ringback by the MRC prevents the standard ringback from interfering with multimedia content provided to the calling party device during connection establishment. In continuation of the above example, MRC 140 suppresses standard ringback to the calling party device UD $106_{A2}$. The method 200 then proceeds to step 252, at which point a determination is made as to whether a response to the connection establishment request is detected.

In one embodiment, the MRC does provide a standard ringback to the calling party device. In one such embodiment, standard ringback is provided by forwarding the SIP 180 RINGING message to the calling party device via the CSCF. In one such embodiment, in which the calling party device and called party device register with different CSCFs, the MRC transmits the SIP 180 RINGING message to the terminating-CSCF (i.e., the CSCF associated with the called party device). In this embodiment, the terminating-CSCF then transmits the SIP 180 RINGING message to the originating-CSCF (i.e., the CSCF associated with the calling party device), which then forwards the SIP 180 RINGING message to the calling party device.

At step 236, the MRC provides multimedia content information to the calling party device. In one embodiment, the multimedia content information comprises non-video content. In one embodiment, non-video content comprise at least one of: text content, still-image content, animated-image content, and like non-video content. In one further embodiment, the non-video content comprises an audio portion. In one such embodiment, the non-video content is provided to the calling party device using at least one message, where the non-video content is carried within the at least one message.

In one embodiment, in which video session establishment is initiated by the calling party device (as opposed to being initiated by the MRC), the multimedia content information comprises at least one video content identifier. In one embodiment, the at least one video content identifier is operable for retrieving video content for display via at least one user interface associated with the calling party device. In another embodiment, the at least one video content identifier is operable for establishing a video session between the calling party device and a remote system, where the video session is operable for providing video content to the calling party device. For example, in one embodiment, a video session comprises a Real-Time Transport Protocol (RTP) session.

In one embodiment, the at least one video content identifier is identified by the MRC using at least a portion of the subscriber service information. For example, in one embodiment, subscriber service information is provided to the MRC in response to the initial filter criteria processing performed by the CSCF. In another embodiment, the at least one video content identifier is identified by the MRC by querying at least one database using called party information and calling party information (e.g., a mapping from the called party to the calling party comprising associated video content identifiers). In one embodiment, the at least one video content identifier comprises at least one of: at least one Uniform Resource Identifier (URI), at least one Uniform Resource Locator (URL), and the like.

In one embodiment, the multimedia content information is provided to the calling party device using at least one SIP message. In one further embodiment, the at least one SIP message comprises at least one SIP 200 OK message. In one such embodiment, the at least one SIP message comprising the multimedia content information is forwarded by the MRC to the calling party device through at least one CSCF associated with the calling party device and the called party device. In continuation of the above example, MRC 140 transmits a SIP message comprising text content, image content, and a video content URI to CSCF 130, and CSCF forwards the SIP message to calling party device UD $106_{A2}$.

At step 238, a determination is made as to whether non-video content is received by the calling party device as a portion of the multimedia content information provided to the calling party device by the MRC. If non-video content is not received, method 200 proceeds to step 242, at which point a determination is made as to whether a video content identifier is received by the calling party device as a portion of the multimedia content information. If non-video content is received, method 200 proceeds to step 240.

At step 240, the calling party device provides the non-video provides the non-video content to at least one user interface associated with the calling party device. In one embodiment, in which the non-video content is provided to the calling party device using a SIP message, the calling party device extracts the non-video content from the SIP message and adapts the non-video content for display to the at least one user interface associated with the calling party device. In continuation of the above example, calling party device UD $106_{A2}$ adapts the non-video content provided in the SIP message for display to at least one user interface associated with calling party device UD $106_{A2}$.

At step 242, a determination is made as to whether a video content identifier is received by the calling party device as a portion of the multimedia content information provided to the calling party device by the MRC. If a video content identifier is received, method 200 proceeds to step 244, at which point the calling party device initiates establishment of a video session with the MRC. If a video content identifier is not received, the method 200 proceeds to step 246, at which point the MRC initiates establishment of a video session with the calling party device.

At step 244, the calling party device initiates establishment of a video session with the MRC. In one embodiment, in which the identified video content is hosted on a remote video server (illustratively, VS 142), the MRC facilitates establishment, management, and termination of the video session between the remote video server and the calling party device. In continuation of the above example, calling party device UD $106_{A2}$ initiates establishment of a video session with MRC 140 using a URI provided to the calling party device in the SIP message received from MRC 140.

In one embodiment, establishment of a video session between the MRC and the calling party device is initiated by the calling party device using a RTSP SETUP message. In this embodiment, the RTSP SETUP message is transmitted by the calling party device to the MRC. Upon receiving the RTSP SETUP message, the MRC responds to the calling party device with a corresponding RTSP 200 OK message. Upon receiving the RTSP 200 OK message from the MRC, the calling party device initiates a RTSP PLAY message to the MRC. Upon receiving the RTSP PLAY message from the calling party device, the MRC responds to the calling party device with a corresponding RTSP 200 OK message. As a result, a RTP session is established between the MRC and the calling party device. In one embodiment, the messaging between the calling party device and the MRC traverses the CSCF associated with the calling party device.

At step 246, the MRC initiates establishment of a video session with the calling party device. In one embodiment, the MRC initiates establishment of the video session contemporaneous with transmission of the multimedia content information to the calling party device. In one embodiment, in which the identified video content is hosted on a remote video server (illustratively, VS 142), the MRC facilitates establishment, management, and termination of a video session between the remote video server and the calling party device. In continuation of the above example, MRC 140 initiates establishment of a video session with calling party device UD $106_{A2}$.

In one embodiment, establishment of a video session between the MRC and the calling party device is initiated by the MRC using a SIP INVITE message. In this embodiment, the SIP INVITE message is transmitted by the MRC to the calling party device. Upon receiving the SIP INVITE message, the calling party device responds to the MRC with a corresponding SIP 200 OK message. Upon receiving the SIP 200 OK message from the calling party device, the MRC initiates a SIP ACK message to the calling party device. As a result, a RTP session is established between the MRC and the calling party device. In one embodiment, the messaging between the calling party device and the MRC traverses the CSCF associated with the calling party device.

In one embodiment, contemporaneous with step 226 and step 236, the method 200 optionally proceeds to step 248. At step 248, a determination is made as to whether video session establishment is initiated by the MRC. In one embodiment, in which RTSP is used for establishing a video session between the calling party device and the MRC, video session establishment is initiated by the calling party device using at least one video content identifier. In another embodiment, in which SIP is used for establishing a video session between the calling party device and the MRC, video session establishment is initiated by the MRC using SIP messaging.

If video session establishment is not initiated by the MRC, method 200 proceeds to step 236, at which point the MRC provides multimedia content information to the calling party device as described herein. In other words, if video session establishment is not initiated by the MRC, the MRC provides multimedia content information (comprising non-video content and at least one video content identifier for enabling the calling party device to initiate establishment of a video session) to the calling party device. In one such embodiment, since video session establishment is initiated by the calling party device, the need for steps 242 and 244 is thereby obviated.

If video session establishment is initiated by the MRC, method 200 proceeds to step 246. As such, if video session establishment is initiated by the MRC, the MRC initiates establishment of the video session between the MRC and the calling party device contemporaneous with providing of non-video content to the calling party device. In other words, if video session establishment is initiated by the MRC, at least a portion of steps 236 through 240 are performed contemporaneous with steps 248 and 246. It should be noted that in one such embodiment, the multimedia content information provided by the MRC does not comprise a video content identifier, thereby obviating the need for steps 242 and 244.

At step 250, the MRC provides video content to the calling party device using the video session established between the calling party device and the MRC. In one embodiment, the at least one video session comprises a RTP session. In another embodiment, the at least one video session comprises a RTSP session In continuation of the above example, the MRC 140 provides video content to calling party device UD 106$_{A2}$ using the video session established between MRC 140 and the UD 106$_{A2}$. The UD 106$_{A2}$ receives the streaming video content from MRC 140 and adapts the streaming video content for display to at least one user interface associated with calling party device UD 106$_{A2}$.

As described herein, in one embodiment, at least a portion of the video content provided to the calling party device is provided by at least one video server in communication with the MRC (illustratively, optional VS 142). In this embodiment, the video session is established in a manner enabling the MRC to maintain control of the video session irrespective of the source of the video content provided to the calling party device. In one embodiment, by maintaining control of the established video session, the MRC is able to provide various enhanced multimedia ringback services functionality (e.g., switching between multimedia content sessions depending on the presence of audio content, providing multimedia content after detection of a response to the connection establishment request, and the like).

As described herein, in one embodiment, steps 236 through 240 (i.e., providing non-video content to a calling party device) may be performed contemporaneously with step 246 (i.e., establishing a video session for providing video content to a calling party device). In other words, since establishment of a video session (and providing video content using the video session) typically requires more time than providing non-video content to a calling party device, a calling party device is provided with various non-video content during completion of video session establishment. As such, upon completion of video session establishment, at least a portion of the non-video content displayed on the calling party device is replaced with the video content provided via the established video session.

At step 252, a determination is made as to whether a response to the connection establishment request is detected. In one embodiment, a response to the connection establishment request comprises at least one of: a called party answering the phone, detecting that the connection establishment request has been transferred to a call answering service (e.g., a voicemail server, call forwarding service, and the like), and like responses. If a response is not detected, method 200 returns to step 250 (i.e., the calling party device continues to receive multimedia content). In other words, multimedia content is continuously provided to the calling party device until a response to the connection establishment request is detected. If a response is detected, method 200 proceeds to step 254.

At step 254, the CSCF notifies the MRC of the detection of a response to the connection establishment request. In one embodiment, notification of the MRC of the detection of the response to the connection establishment request is performed using a SIP 200 OK message. In one embodiment, transmission of the SIP 200 OK message from the called party device to the calling party device is facilitated by the CSCF associated with the called party device. In continuation of the above example, called party device UD 106$_{B1}$ transmits a SIP 200 OK message to CSCF 130, which then transmits the SIP 200 OK message to MRC 140. Although depicted serially, in one embodiment, steps 250, 252, and 254 are performed contemporaneously.

At step 256, a determination is made as to whether multimedia content termination is delayed. In one embodiment, multimedia content termination is delayed using at least one delay parameter (e.g., RTSP RANGE parameter). In one embodiment, the multimedia content is configured to continue for a specific length of time measured from at least one of: the initiation of the connection establishment request, the establishment of the video session, the detection of a response to the connection establishment request, and the like. In another embodiment, the MRC will delay video content termination until the video content is complete (i.e., the complete video clip is finished playing). If multimedia content termination is not delayed, method 200 proceeds to step 260. If multimedia content termination is delayed, method 200 proceeds to step 258.

At step 258, the MRC continues providing at least a portion of the multimedia content to the called party device for the duration of multimedia content termination delay period. As such, the multimedia content termination delay period essentially operates as a timer by which the MRC determines a length of time for which the multimedia content continues to be provided to the calling party device after a response to the connection establishment request is detected (e.g., after the called party answers the incoming call).

In one embodiment, the MRC suppresses initiation of a connection establishment response detected message to the calling party device. In one embodiment, the connection establishment response detected message comprises al least one of: a SIP 200 OK message, a SIP (re)INVITE message, and like messages as known in the art. In one such embodiment, the connection establishment response detected message is suppressed for a length of time required to completely provide the video content to the calling party device. As such, in this embodiment, the multimedia content termination delay period comprises the length of time required to completely provide the video content to the calling party device.

At step 260, the MRC transmits a connection establishment response detected message to the calling party device. In one embodiment, the connection establishment response detected message traverses at least one CSCF. In one embodiment, the connection establishment response detected message comprises a SIP 200 OK message. In another embodiment, the connection establishment response detected message comprises a SIP (re)INVITE message. In continuation of the above example, MRC 140 initiates a SIP 200 OK message to calling party device UD $106_{A2}$ via CSCF 130.

At step 262, the calling party device transmits a connection establishment response detected acknowledgement message to the called party device. In one embodiment, the connection establishment response detected acknowledgement message traverses at least one CSCF and the MRC. In one embodiment, in which the connection establishment response detected message comprises a SIP 200 OK message, the connection establishment response detected acknowledgement message comprises a SIP ACK message. In continuation of the above example, calling party device UD $106_{A2}$ transmits a SIP ACK message to called party device UD $106_{B1}$ via CSCF 130 and MRC 140.

In another embodiment, in which a connection establishment response detected message comprises a SIP (re)INVITE message, the connection establishment response detected acknowledgement message initiated by the calling party device comprises a SIP 200 OK (re)INVITE message. In this embodiment, upon receiving the SIP 200 OK (re)INVITE message, the MRC initiates respective SIP ACK messages to the called party device and the calling party device contemporaneously.

At step 264, transmission of the video content is terminated. At step 266, the video session over which the video content is provided is released. In one embodiment, in which the video session is established using RTSP, release of the video session is initiated by the MRC using a RTSP TEARDOWN message. In another embodiment, in which the video session is established using SIP, release of the video session is initiated by the MRC using a SIP BYE message. At step 268, voice communication between the calling party and the called party begins. The voice communication is supported using the VOIP connection established between the calling party device and the called party device. The method 200 then proceeds to step 270, where method 200 ends.

Although described herein as terminating prior to the beginning of voice communications, in one embodiment, at least a portion of the multimedia content may continue to be provided to the calling party device after the beginning of voice communications. For example, an animated image may continue to be displayed on at least one interface associated the calling party device after the beginning of voice communications. Similarly, a variety of other multimedia content may continue to be displayed on the calling party device after the beginning of voice communications.

In one embodiment, at least a portion of the multimedia content displayed to the calling party via at least one user interface associated with the calling party device is capable of being controlled (e.g., paused, stopped, resumed, and the like) by the calling party. In one such embodiment, control of at least a portion of the multimedia content is achieved by the calling party manually by actuating at least one user entry means (e.g., a button, a touch-screen, and the like) available via the user interface associated with the calling party device.

It is contemplated that at least a portion of the described functions may be combined into fewer functional elements/devices. Similarly, it is contemplated that various functions may be performed by other functional elements/devices, or that the various functions may be distributed across the various functional elements/devices in a different manner. For example, at least a portion of the functions performed by MRC 140 may be performed by the NEs 104 and CSCF 130. Furthermore, although described herein with respect to one MRC, at least a portion of the described functions may be distributed across a plurality of MRCs.

Figure 3:
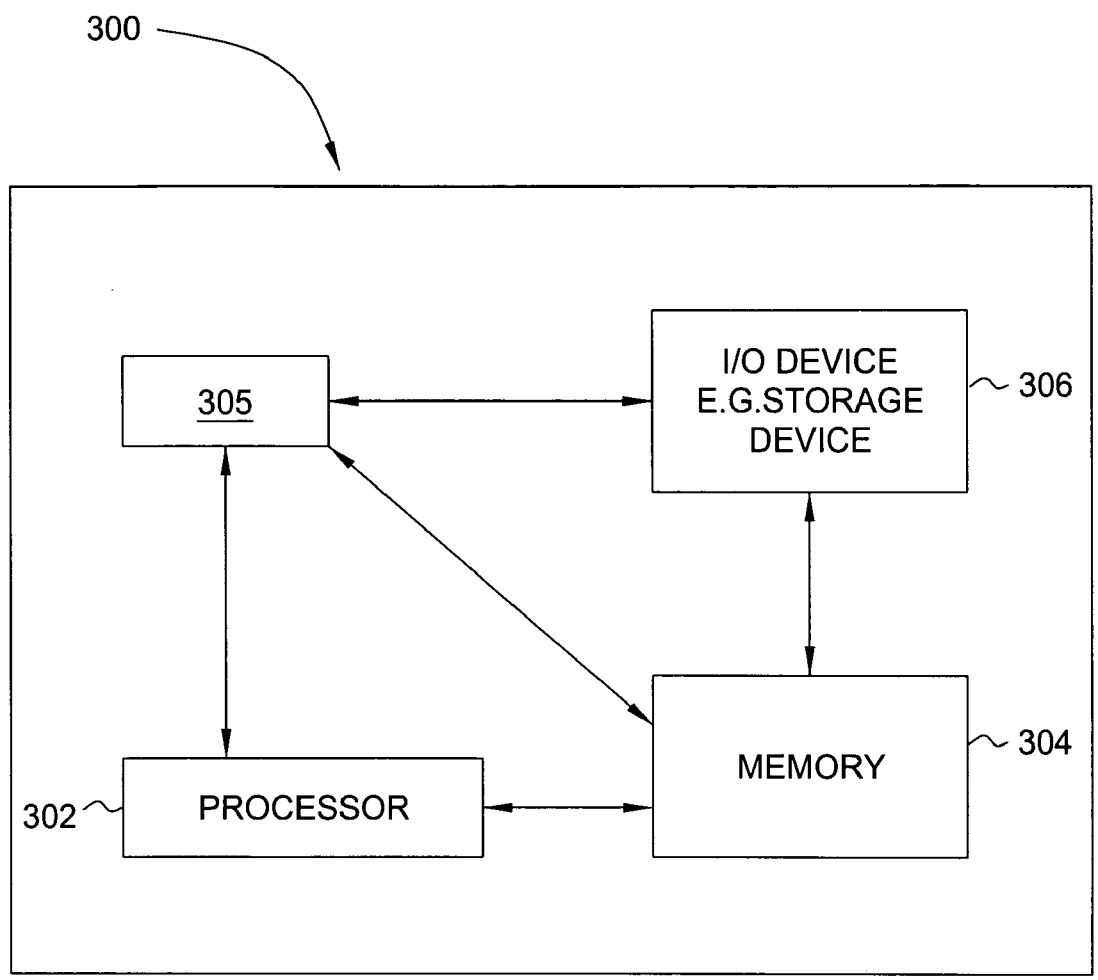
FIG. 3 depicts a high level block diagram of a general purpose computer suitable for use in performing the functions described herein.

FIG. 3 depicts a high level block diagram of a general purpose computer suitable for use in performing the functions described herein. As depicted in FIG. 3, system 300 comprises a processor element 302 (e.g., a CPU), a memory 304, e.g., random access memory (RAM) and/or read only memory (ROM), a multimedia ringback controller module 305, and various input/output devices 306 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present multimedia ringback controller module or process 305 can be loaded into memory 304 and executed by processor 302 to implement the functions as discussed above. As such, the present multimedia ringback controller process 305 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for providing multimedia content to a calling party device requesting a connection with a called party device, comprising:

receiving a connection establishment request message for requesting establishment of a connection between the calling party device and the called party device;

identifying multimedia content information associated with multimedia content in response to the connection establishment request message, wherein the multimedia content information comprises non-video content and a video content identifier adapted for use by the calling party device to initiate a request for video content associated with the video content identifier; and transmitting the multimedia content information toward the calling party device using a content information message, wherein the multimedia content information is transmitted toward the calling party device contemporaneously with establishment of the connection.

2. The method of claim 1, wherein the non-video content comprises at least one of text-based content, still-image content, and animated-image content.

3. The method of claim 1, wherein identifying multimedia content information comprises:

determining at least one multimedia content characteristic associated with the multimedia content;

determining at least one terminal capability parameter associated with the calling party device; and selecting at least a portion of the multimedia content information according to the at least one multimedia content characteristic and the at least one terminal capability parameter.

4. The method of claim 1, further comprising:
receiving a video session establishment request message including the video content identifier; and
transmitting, toward the calling party device, a video session establishment response message;
wherein the video session establishment request and response messages are adapted for use in establishing a video session operable for providing video content to the calling party device.

5. The method of claim 4, further comprising:
receiving a video content request message; and
providing, toward the calling party device, video content identified by the video content identifier included in the video session establishment request message.

6. The method of claim 5, wherein:
the connection establishment request message and the content information message are Session Initiation Protocol (SIP) messages; and
the video session establishment request message, the video session establishment response message, and the video content request message are Real Time Steaming Protocol (RTSP) messages.

7. The method of claim 5, further comprising:
initiating termination of providing the video content toward the calling party device.

8. The method of claim 1, further comprising:
delaying transmission of the connection establishment request message toward the called party device.

9. The method of claim 1, further comprising:
receiving a connection establishment acceptance message indicating acceptance by the called party device of the request for establishment of a connection between the calling party device and the called party device; and
delaying transmission of the connection establishment acceptance message toward the calling party device.

10. The method of claim 9, wherein the connection establishment request message, the connection establishment acceptance message, and the content information message are Session Initiation Protocol (SIP) messages.

11. A computer readable storage medium storing a software program, that, when executed by a computer, causes the computer to perform a method for providing multimedia content to a calling party device requesting a connection with a called party device, the method comprising:
receiving a connection establishment request message for requesting establishment of a connection between the calling party device and the called party device;
identifying multimedia content information associated with multimedia content in response to the connection establishment request message, wherein the multimedia content information comprises non-video content and a video content identifier adapted for use by the calling party device to initiate a request for video content associated with the video content identifier; and
transmitting the multimedia content information toward the calling party device using a content information message, wherein the multimedia content information is transmitted toward the calling party device contemporaneously with establishment of said the connection.

12. The computer readable storage medium of claim 11, wherein the non-video content comprises at least one of text-based content, still-image content, and animated-image content.

13. The computer readable storage medium of claim 11, wherein identifying multimedia content information comprises:
determining at least one multimedia content characteristic associated with the multimedia content;
determining at least one terminal capability parameter associated with the calling party device; and
selecting at least a portion of the multimedia content information according to the at least one multimedia content characteristic and the at least one terminal capability parameter.

14. The computer readable storage medium of claim 11, further comprising:
receiving a video session establishment request message including the video content identifier; and
transmitting, toward the calling party device, a video session establishment response message;
wherein the video session establishment request and response messages are adapted for use in establishing a video session operable for providing the video content to said the calling party device.

15. The computer readable storage medium of claim 11, further comprising:
receiving a video content request message; and
providing, toward the calling party device, video content identified by the video content identifier included in the video session establishment request message.

16. The computer readable storage medium of claim 15, wherein:
the connection establishment request message and the content information message are Session Initiation Protocol (SIP) messages; and
the video session establishment request message, the video session establishment response message, and the video content request message are Real Time Steaming Protocol (RTSP) messages.

17. The computer readable storage medium of claim 15, further comprising:
initiating termination of providing the video content toward the calling party device.

18. The computer readable storage medium of claim 11, further comprising:
delaying transmission of the connection establishment request message toward the called party device.

19. The computer readable storage medium of claim 11, further comprising:
receiving a connection establishment acceptance message indicating acceptance by the called party device of the request for establishment of a connection between the calling party device and the called party device; and
delaying transmission of the connection establishment acceptance message toward the calling party device.

20. An apparatus for providing multimedia content to a calling party device, comprising:
means for receiving a connection establishment request message for requesting establishment of a connection between the calling party device and the called party device;
means for identifying multimedia content information associated with multimedia content in response to the connection establishment request message, wherein the multimedia content information comprises non-video content and a video content identifier adapted for use by the calling party device to initiate a request for video content associated with the video content identifier; and
means for transmitting at least a portion of said the multimedia content information toward the calling party device using a content information message, wherein the multimedia content information is transmitted toward the calling party device contemporaneously with establishment of said connection.

21. A method for providing multimedia content to a calling party device requesting a connection with a called party device, comprising:
- receiving a connection establishment request message for requesting establishment of a connection between the calling party device and the called party device;
- identifying multimedia content in response to the connection establishment request message, wherein the multimedia content comprises non-video content and video content;
- transmitting, toward the calling party device, a content message including the identified non-video content;
- transmitting, toward the calling party device, a video session request message requesting establishment of a video session for use in transmitting the identified video content toward the calling party device;
- receiving a video session response message associated with the video session request message; and
- transmitting the video content toward the calling party device using the video session.

22. A method for providing multimedia content to a calling party device requesting a connection with a called party device, comprising:
- receiving a connection establishment request message for requesting establishment of a connection between the calling party device and the called party device;
- obtaining multimedia content information in response to the connection establishment request message, the multimedia content information comprising non-video content and at least one video content identifier associated with video content; and
- transmitting the multimedia content information toward the calling party device contemporaneously with establishment of the connection;
- wherein the at least one video content identifier is adapted for use by the calling party device in initiating a video session to be established contemporaneously with presentation of the non-video content by the calling party device;
- wherein the video session is adapted to provide the video content to the calling party device contemporaneously with establishment of the connection.

* * * * *